United States Patent
Zhu et al.

(10) Patent No.: US 9,635,098 B2
(45) Date of Patent: Apr. 25, 2017

(54) OPEN PLATFORM, OPEN PLATFORM ACCESS SYSTEM, STORAGE MEDIUM, AND METHOD FOR ALLOWING THIRD PARTY APPLICATION TO ACCESS OPEN PLATFORM

(71) Applicant: TENCENT TECHNOLOGY (SHENZHEN) COMPANY LIMITED, Guangdong (CN)

(72) Inventors: Nianyang Zhu, Guangdong (CN); Yanping Guan, Guangdong (CN); Dongliang Zhang, Guangdong (CN); Tong Rui, Guangdong (CN); Puguang Huang, Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/419,645

(22) PCT Filed: Sep. 11, 2013

(86) PCT No.: PCT/CN2013/083261
§ 371 (c)(1),
(2) Date: Feb. 4, 2015

(87) PCT Pub. No.: WO2014/044134
PCT Pub. Date: Mar. 27, 2014

(65) Prior Publication Data
US 2015/0195346 A1  Jul. 9, 2015

(30) Foreign Application Priority Data
Sep. 20, 2012 (CN) .......................... 2012 1 0351808

(51) Int. Cl.
*H04L 29/08* (2006.01)
*H04L 29/06* (2006.01)
*G06F 9/44* (2006.01)

(52) U.S. Cl.
CPC .............. *H04L 67/10* (2013.01); *H04L 67/04* (2013.01); *H04L 67/42* (2013.01); *G06F 8/20* (2013.01); *H04L 67/1095* (2013.01); *H04L 67/20* (2013.01)

(58) Field of Classification Search
CPC .... G06F 21/128; H04L 63/0884; H04L 67/20
See application file for complete search history.

(56) References Cited

U.S. PATENT DOCUMENTS

| 2005/0130611 A1* | 6/2005 | Lu | ........................... H04L 69/18 455/130 |
| 2008/0294479 A1* | 11/2008 | Emling | .............. G06Q 30/0224 705/4 |

(Continued)

FOREIGN PATENT DOCUMENTS

| CN | 102299936 A | 12/2011 |
| CN | 102591705 A | 7/2012 |
| CN | 102664920 A | 9/2012 |

OTHER PUBLICATIONS

International Search Report mailed Dec. 26, 2013 in International Application No. PCT/CN2013/083261, filed Sep. 11, 2013.

*Primary Examiner* — Barbara Burgess
(74) *Attorney, Agent, or Firm* — Knobbe Martens Olson & Bear LLP (57) ABSTRACT

The present invention relates to the technical field of computers. Provided are an open platform, open platform access system, storage medium, and method for allowing a third party application to access an open platform, the method comprising: acquiring the identification information a user uses to access a target open platform; according to the (Continued)

acquired identification information and the corresponding relationship between the pre-established identification information of the user in the target open platform and the identification information in a preset open platform, determining the identification information of the user in the preset open platform; according to the identification information of the user in the preset open platform, invoking via the open interface of the preset open platform the data of the target open platform stored in the preset open platform. The present invention allows a third party application to access a plurality of target open platforms only by connecting to a preset open platform, without maintenance and joint debugging of multiple sets of codes, thus effectively saving resources, and accelerating the launching of the third party application on the target open platform.

7 Claims, 4 Drawing Sheets

(56) References Cited

U.S. PATENT DOCUMENTS

| | | | |
|---|---|---|---|
| 2011/0023016 A1* | 1/2011 | Khader | G06F 8/20 717/120 |
| 2012/0239620 A1* | 9/2012 | Masini | H04L 67/1095 707/634 |
| 2012/0244950 A1* | 9/2012 | Braun | G07F 17/3244 463/42 |
| 2013/0191502 A1* | 7/2013 | Bommireddy | H04L 67/04 709/217 |
| 2013/0263232 A1* | 10/2013 | Yang | H04L 63/08 726/4 |

* cited by examiner

OPEN PLATFORM, OPEN PLATFORM ACCESS SYSTEM, STORAGE MEDIUM, AND METHOD FOR ALLOWING THIRD PARTY APPLICATION TO ACCESS OPEN PLATFORM

This application claims the priority of Chinese Application No. 201210351808.5, filed on Sep. 20, 2012 by Tencent Technology (Shenzhen) Co., Ltd., entitled "Method For Allowing Third Party Application To Access Open Platform, And Open Platform Access System", the disclosure of which is hereby incorporated by reference in its entirety.

TECHNICAL FIELD

The present disclosure is related to the field of computer technologies, in particular to a method for allowing a third party application to access an open platform, an open platform access system, an open platform and a storage medium.

BACKGROUND

A third party application refers to an external application based on an open platform. A third party application developer, as an independent content provider, gains certain brand benefits and capital income through issuing products on the open platform. With the advance of open strategies, it becomes more important to allow the third party application to login more open platforms (such as a social network platform) with the minimal cost and the lowest price.

In a current technical solution for allowing a third party application to login a plurality of open platforms, the third party application developer modifies service logic codes according to an Open Application Programming Interface (OpenAPI) access protocol provided by the open platform to be accessed, jointly tests interfaces such as a payment interface and a relationship chain interface in combination with the open platform to be accessed, and finds another machine for deploying service codes passing the joint test, so as to launch the third party application on the open platform.

However, at least the following technical problems exist in the technical solution in the prior art.

To allow a third party application to access to a plurality of open platforms, the third party application is required to interface with the plurality of open platforms, so that a plurality of sets of service codes need for maintaining, and a plurality of joint tests shall be conducted, resulting in a slow speed of allowing the third party application to access the open platforms; further, a resource waste is caused because service codes for different platforms are required to be deployed on different machines.

SUMMARY

One aspect of embodiments of the present invention is to provides an open platform, an open platform access system, a method for allowing a third party application to access an open platform, and a storage medium, to solve the following problems in the prior art that: to allow a third party application to access to a plurality of open platforms, the third party application is required to interface with the plurality of open platforms, so that a plurality of sets of service codes need for maintaining, and a plurality of joint tests shall be conducted, resulting in a slow speed of allowing the third party application to access the open platforms; further, a resource waste is caused because service codes for different platforms are required to be deployed on different machines.

Embodiments of the present invention provide the following technical solutions.

A method for allowing a third party application to access an open platform, comprising:

acquiring the identification information used by a user to access a target open platform, when receiving the information that the user is operating a third party application to access the target open platform, wherein the third party application is an application already launched on a preset open platform;

determining the identification information of the user in the preset open platform, according to the acquired identification information and the corresponding relationship between the pre-established identification information of the user in the target open platform and the identification information of the user in the preset open platform which preferably acquires and stores the data of the target open platform through an open interface in advance;

invoking the data of the target open platform stored in the preset open platform via an open interface of the preset open platform, according to the identification information of the user in the preset open platform.

An embodiment of the present invention provides an open platform, comprising:

a data acquiring unit configured to form a user access account number interoperability between a present open platform and a target open platform and to acquire and store the data of the target open platform; and an open interface unit configured to open an interface for the target open platform to invoke functional interfaces and/or the data of the present open platform according to requirements of the target open platform.

An embodiment of the present invention further provides an open platform access system, comprising:

an acquiring unit configured to acquire the identification information used by a user to access a target open platform, when receiving the information that the user is operating a third party application to access the target open platform, wherein the third party application is an application already launched on a preset open platform;

a determining unit configured to determine the identification information of the user in the preset open platform, according to the acquired identification information and the corresponding relationship between the pre-established identification information of the user in the target open platform and the identification information of the user in the preset open platform;

an invoking unit configured to invoke the data of the target open platform stored in the preset open platform via an open interface of the preset open platform, according to the identification information of the user in the preset open platform.

A storage medium containing computer-executable instructions, wherein the computer-executable instructions, when being executed by a processor, are configured to perform a method for allowing a third party application to access an open platform, wherein the method comprises:

acquiring the identification information used by a user to access a target open platform, when receiving the information that the user is operating a third party application to access the target open platform, wherein the third party application is an application already launched on a preset open platform;

determining the identification information of the user in the preset open platform, according to the acquired identification information and the corresponding relationship between the pre-established identification information of the user in the target open platform and the identification information of the user in the preset open platform;

invoking the data of the target open platform stored in the preset open platform via an open interface of the preset open platform, according to the identification information of the user in the preset open platform.

Compared with the prior art, embodiments of the present invention have the following beneficial effect. In the present invention, by storing the data of the target open platform into the preset open platform in advance, the data of the target open platform stored by the preset open platform can be invoked by open interfaces of the preset open platform when the user operates the third party application to access the target open platform. Whereas, when the third party application needs to access a plurality of target open platforms, the third party application is only required to interface with the target open platform to invoke corresponding target open platform data from the preset open platform, without developing a plurality of sets of service code or making corresponding code maintaince and join-test for the plurality of target open platforms. Moreover, all service codes of the third party application with respect to all target open platforms can be deployed on a machine of the preset open platform system, therefore, resources are preserved efficiently and the speed for get online on the target open platform by the third party application is improved. Moreover, functions of the third party application are enriched since the third party application can use various functional interfaces of the preset open platform.

BRIEF DESCRIPTION OF THE DRAWINGS

Accompanying drawings used for the description of embodiments of the invention are briefly introduced below, to illustrate the solutions in the embodiments more clearly. Apparently, the drawings in the following description are used for describing some embodiments of the invention, and further drawings can be obtained according to the described drawings without any creative work by those skilled in the art.

DETAILED DESCRIPTION

The present disclosure is further described in detail below in conjunction with the accompanying drawings and embodiments to make objectives, technical solutions and advantages of the disclosure more apparent. It should be understood that specific embodiments described here are only used to explain but not to limit the present disclosure.

An embodiment of the present invention provides a method for allowing a third party application to access an open platform, including:

acquiring identification information used by a user to access a target open platform, when receiving information that the user is operating a third party application to access the target open platform, where the third party application is an application already launched on a preset open platform;

determining identification information of the user in the preset open platform, according to the acquired identification information and a pre-established corresponding relationship between the identification information of the user in the target open platform and the identification information of the user in the preset open platform, preferably, data of the target open platform is acquired and stored in advance by the preset open platform through an open interface; and invoking the data of the target open platform stored in the preset open platform via an open interface of the preset open platform, according to the identification information of the user in the preset open platform.

An embodiment of the present invention further provides an open platform, including:

a data acquiring unit configured to form user access account interoperability between the present open platform (i.e. the open platform including the acquiring unit) and a target open platform and to acquire and store data of the target open platform in advance; and an open interface unit configured to open an interface, where the interface is used by the target open platform to invoke a functional interface and/or data of the present open platform, according to requirements of the target open platform.

An embodiment of the present invention further provides an open platform access system, including:

an acquiring unit configured to acquire identification information used by a user to access a target open platform, when receiving information that the user is operating a third party application to access the target open platform, where the third party application is an application already launched on a preset open platform;

a determining unit configured to determine identification information of the user in the preset open platform, according to the acquired identification information and the pre-established corresponding relationship between the identification information of the user in the target open platform and the identification information of the user in the preset open platform, where data of the target open platform is acquired and stored by the present open platform through an open interface in advance; and an invoking unit configured to invoke the data of the target open platform stored in the preset open platform via an open interface of the preset open platform, according to the identification information of the user in the preset open platform. The present disclosure is described below in detail in combination with specific embodiments.

A First Embodiment

Figure 1:
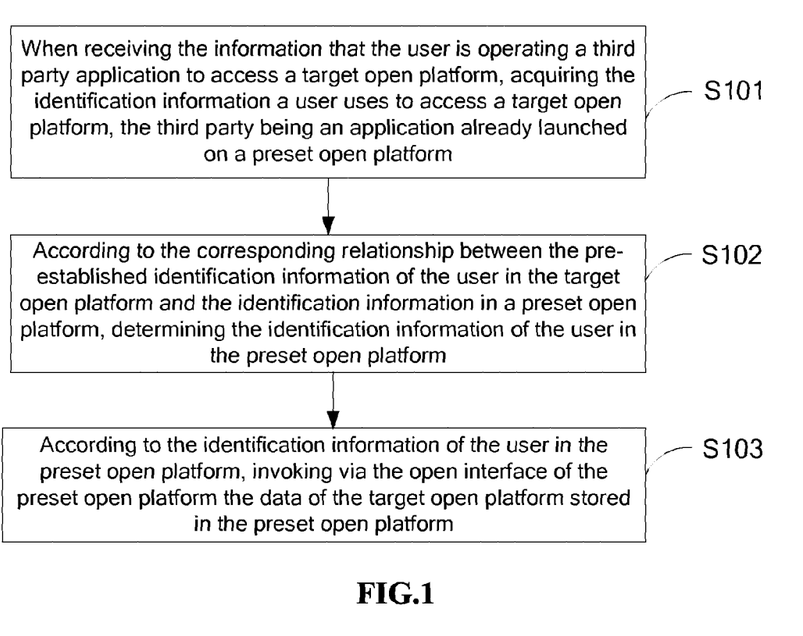
FIG. 1 is an implementation flowchart of a method for allowing a third party application to access an open platform provided by a first embodiment of the invention.

FIG. 1 shows an implementation flowchart of a method for allowing a third party application to access an open platform provided by a first embodiment of the invention. The method for allowing a third party application to access an open platform includes Steps S101-S103 described in detail below.

Step S101: acquiring identification information used by a user to access a target open platform, when receiving information that the user is operating a third party application to access the target open platform, where the third party application is an application already launched on a preset open platform.

In this embodiment, the third party application refers to an external application based on the open platform. A third party application developer, which is an independent content provider, gains certain brand benefits and capital income through issuing products thereof on the open platform.

In this embodiment, the third party application is pre-deployed on the preset open platform.

In this embodiment, the target open platform may be the Friends social network platform, the KAIXIN social network platform, etc.

In this embodiment, when attempting to login the target open platform for the first time, the user is first required to register user identification information. When attempting to login the target open platform for the next time, the user can login the target open platform by inputting the identification information. Here, the identification information includes an account, an account name, or a login password of the user or any combination thereof.

Step S102: determining identification information of the user in the preset open platform, according to the acquired identification information and the pre-established corresponding relationship between the identification information of the user in the target open platform and the identification information of the user in the preset open platform, where, preferably data of the target open platform is acquired and stored by the preset open platform through an open interface in advance.

In this embodiment, user access account interoperability between the present open platform and the target open platform is realized through the pre-established corresponding relationship between the identification information of the user in the target open platform and the identification information of the user in the preset open platform.

In this embodiment, the pre-established corresponding relationship between the identification information of the user in the target open platform and the identification information of the user in the preset open platform is searched for according to the identification information used by the user to login the target open platform, to determine the identification information of the user in the preset open platform.

In this embodiment, the user registers the user identification information with the preset open platform in advance, so that the user can login the preset open platform by inputting the user identification information.

In this embodiment, the stored data of the target open platform may be user relationship chain data and user information data in the target open platform.

In this embodiment, by introducing the data of the target open platform into the preset open platform, the third party application developer can use the data of the target open platform almost without any code modification. That is, the user can operation information of the third party application over the preset open platform without interfacing with the target open platform or maintaining codes.

Step S103: invoking the data of the target open platform stored in the preset open platform via an open interface of the preset open platform, according to the identification information of the user in the preset open platform.

In this embodiment, the preset open platform stores the data of at least one target open platform, so that the third party application developer can access each of the at least one target open platform by interfacing with the preset open platform.

Optionally, the preset open platform may be provided in advance with a plurality of functional interfaces such as a payment interface and a security interface. The target open platform may share resources of the preset open platform by invoking the functional interfaces of the preset open platform through the open interface of the present open platform, according to the identification information of the user in the preset open platform.

In this embodiment, the data of the target open platform is stored in the preset open platform in advance, so that the data of the target open platform stored by the preset open platform can be invoked by an open interface of the preset open platform when the user operates the third party application to access the target open platform. Also, to access a plurality of target open platforms, the third party application is only required to interface with the target open platform to invoke data of the respective target open platforms without developing a plurality of sets of service codes and maintaining and jointly testing the service codes with respect to the plurality of target open platforms. Moreover, all service codes of the third party application with respect to all target open platforms can be deployed on a machine for the preset open platform system, thereby effectively saving resources and improving the speed of launching the third party application on the target open platform. Moreover, functions of the third party application are enriched using various functional interfaces of the preset open platform.

A Second Embodiment

Figure 2:
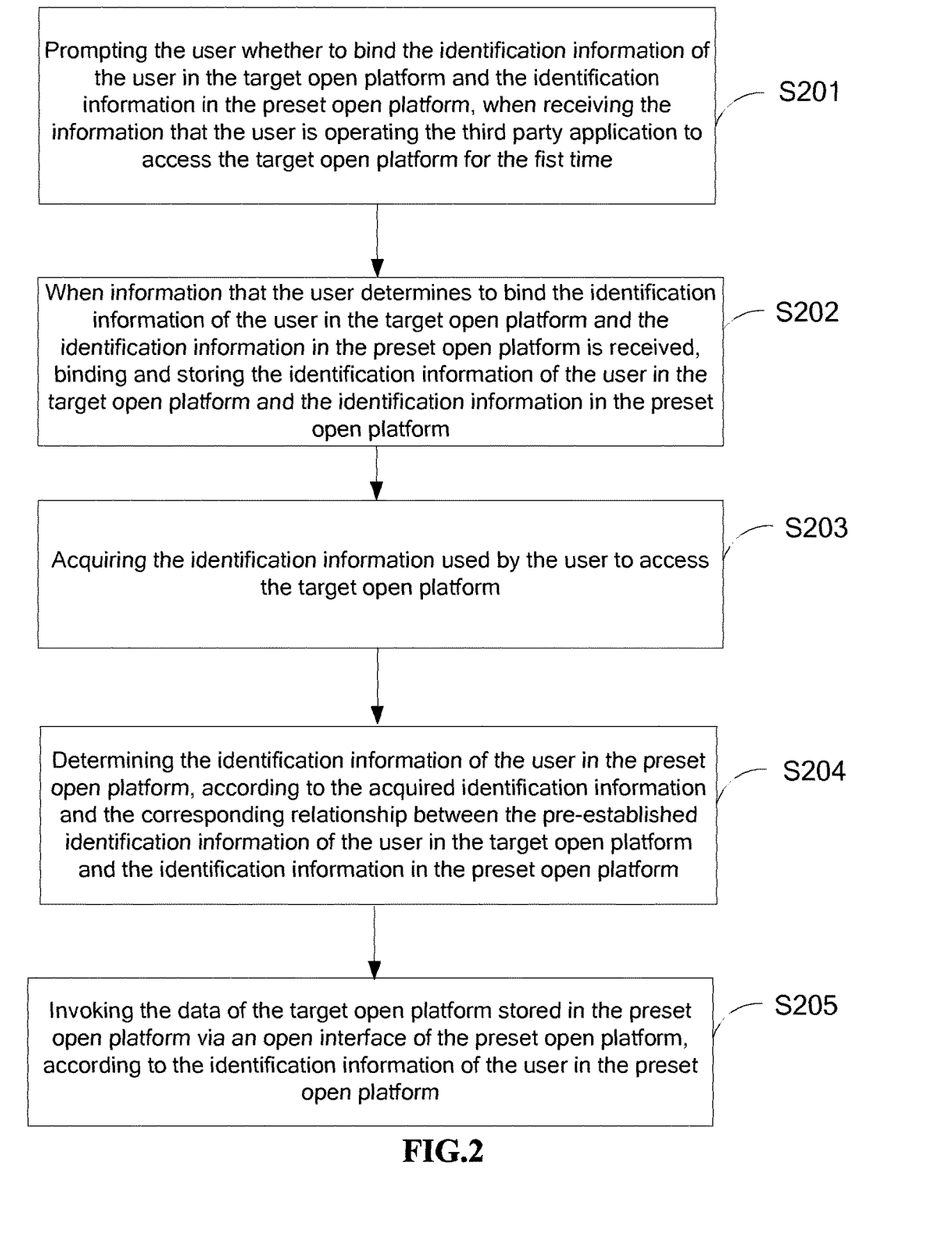
FIG. 2 is an implementation flowchart of a method for allowing a third party application to access an open platform provided by a second embodiment of the invention.

FIG. 2 is an implementation flowchart of a method for allowing a third party application to access an open platform provided by a second embodiment of the invention. The method for allowing a third party application to access an open platform includes steps S201-S205 detailed described below.

In Step S201: prompting the user whether to bind the identification information of the user in the target open platform and the identification information of the user in the preset open platform, when receiving information that the user is operating the third party application to access the target open platform for the first time, where the third party application is an application already launched on the preset open platform.

In this embodiment, prompt information including a voice prompt, a dialogue box prompt may be used to prompt the user whether to bind the identification information of the user in the target open platform and the identification information of the user in the preset open platform.

In step S202, when information that the user determines to bind the identification information of the user in the target open platform and the identification information of the user in the preset open platform is received, binding and storing the identification information of the user in the target open platform and the identification information of the user in the preset open platform.

In step S203, acquiring the identification information used by the user to access the target open platform.

In step S204, determining the identification information of the user in the preset open platform, according to the acquired identification information and the pre-established corresponding relationship between the identification information of the user in the target open platform and the identification information of the user in the preset open platform which preferably acquires and stores the data of the target open platform through an open interface in advance.

In step S205, invoking the data of the target open platform stored in the preset open platform via an open interface of the preset open platform, according to the identification information of the user in the preset open platform.

In this embodiment, implementing processes of steps S203-205 are similar to those of steps S101-S103 detailed described above with reference to the first embodiment.

Figure 3:
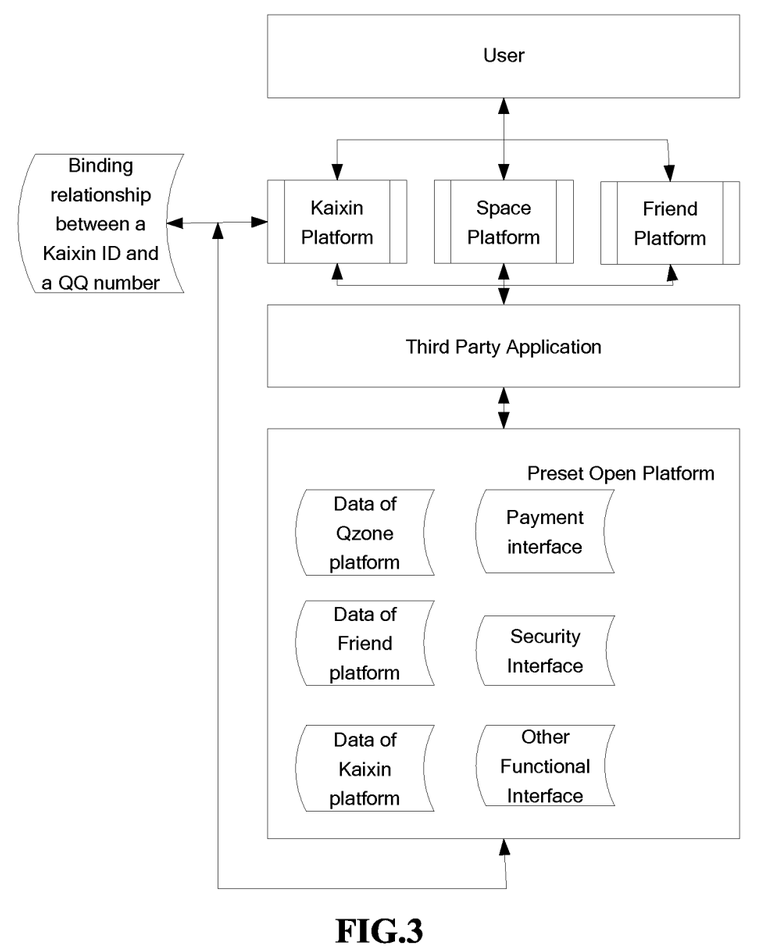
FIG. 3 is a structural diagram of an architecture by which a user operates a third party application to access the KAIXIN website platform using the method for allowing a third party application to access an open platform provided by the second embodiment of the invention.

For a better understanding, an implementing process for the third party application to access the KAIXIN social network platform is described below. However, the present invention is not limited thereto. Reference is now made to FIG. 3 which shows a structural diagram of an architecture by which a user operates a third party application to access the KAIXIN social network platform. The access process is described below.

When the user logins the KAIXIN social network platform for the first time to use the third party application, the user is prompted to bind the user's Kaixin ID and QQ number. When information that the user approves to the bind, the user's Kaixin ID and QQ number is bound. According to a bound QQ number, the Tencent OpenAPI platform acquires and stores data of the KAIXIN social network platform. Since the Tencent OpenAPI platform has already stored the user relationship chain and open application interface programs, the third party application can support the KAIXIN social network platform and the third party application can also use Tencent cloud computing devices such as a payment system, a security system.

When the user uses the third party application to access the Tencent OpenAPI platform for the next time, the user can find the stored corresponding relationship between the user's Kaixin ID and QQ number, then the user invokes directly data of the KAIXIN social network platform stored in the Tencent OpenAPI platform and platform data of the Tencent OpenAPI platform itself.

The process mentioned above for the user to use the third party application to access the Tencent OpenAPI platform greatly improves the speed to access the KAIXIN social network platform for the third party application which has already got online by the Tencent OpenAPI platform, because user data relationship chains of the KAIXIN social network platform are stored by the Tencent OpenAPI platform. The third party application no longer needs to find machine deployed codes. Instead, the third party application can reuse the Hosting machine provided by Tencent. On the KAIXIN social network platform, the third party application can use mature payment interfaces of the Tencent OpenAPI platform. The Tencent OpenAPI platform provides an OpenAPI which supports KAIXIN social network relationship chains and personal data and can be used by the third party application directly.

In addition, when accessing a plurality of target open platforms such as a space platform and a friend platform, the operation process of the third party application is similar to operation process for accessing the KAIXIN social network platform, therefore, will not be described unnecessarily here. At this moment, the third party application is only required to interface with the preset open platform but not different target open platforms, therefore greatly improves the speed for the third party application to access the target open platform. The third party application no longer needs to find machine deployed codes. Instead, the third party application can reuse a host device corresponding to the preset open platform. Moreover, latency for the third party application to access the target open platform can be decrease because the data of the target open platform are stored by the preset open platform.

Furthermore, the preset open platform may be provided with a plurality of functional interfaces such as a payment interface, a security interface, therefore, the KAIXIN social network platform, the space platform and the friend platform may share resources by invoking interface data of the preset open platform.

A Third Embodiment

Figure 4:
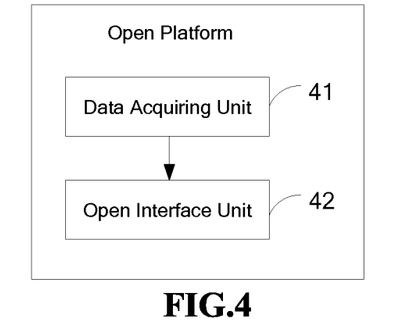
FIG. 4 is a structural diagram of an open platform provided by a third embodiment of the invention.

FIG. 4 is a structural diagram of an open platform provided by a third embodiment of the invention. For the sake of description, only parts relevant to embodiments of the present invention are illustrated in the figure.

The open platform comprises a data acquiring unit 41 and an open interface unit 42.

The data acquiring unit 41 is configured to form user access account interoperability between a present open platform and a target open platform and to acquire and store the data of the target open platform; and The open interface unit 42 is configured to open an interface for the target open platform to invoke the data of the present open platform according to requirements of the target open platform.

In this embodiment, the preset open platform is provided with a plurality of functional interfaces to be invoked by the target open platform, such that resource share can be achieve among the plurality of f target open platform to saving resources effectively.

In this embodiment, the user access account interoperability is formed between the open platform and the target open platform. The data of the target open platform are acquired and stored in advance. The interface is opened for the target open platform to invoke the data of the present open platform according to requirements of the target open platform. By the account interoperability between the target open platform and a plurality of target open platforms, the third party application can use data stored by the preset open platform to access the target open platform uniformly, without developing a plurality of sets of service code or making corresponding code maintaince and join-test for the plurality of target open platforms.

A Fourth Embodiment

Figure 5:
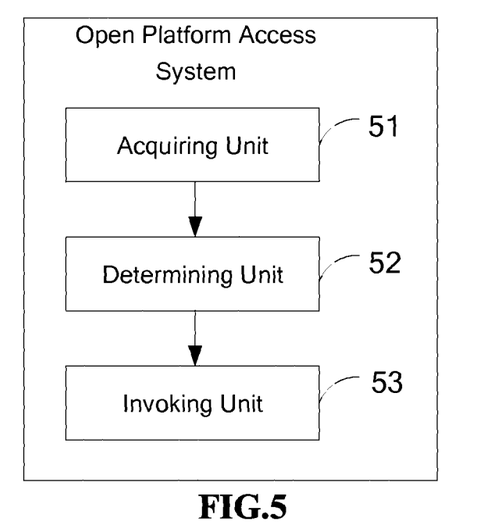
FIG. 5 is a structural diagram of an open platform access system provided by a fourth embodiment of the invention.

FIG. 5 is a structural diagram of an open platform access system provided by a fourth embodiment of the invention. For the sake of description, only parts relevant to embodiments of the present invention are illustrated in the figure.

The open platform access system comprises an acquiring unit 51, a determining unit 52 and an invoking unit 53.

The acquiring unit 51 is configured to acquire the identification information used by a user to access a target open platform, when receiving the information that the user is operating a third party application which is an application, already launched on a preset open platform, to access the target open platform.

The determining unit 52 is configured to determine the identification information of the user in the preset open platform, according to the acquired identification information and the pre-established corresponding relationship between the identification information of the user in the target open platform and the identification information of the user in the preset open platform.

The invoking unit 53 is configured to invoke the data of the target open platform stored in the preset open platform via an open interface of the preset open platform, according to the identification information of the user in the preset open platform.

The preset open platform can acquire and store the data of the target open platform via an open interface in advance.

The preset open platform is provided with a plurality of functional interfaces. The invoking unit 53 is further configured to invoke functional interfaces of the preset open platform via an open interface of the preset open platform, according to the identification information of the user in the preset open platform.

The data of the target open platform comprises the user relationship chain data and the user information data in the target open platform.

The open platform access system provided in this invention can be used in above mentioned corresponding first embodiment of method. That is, the method for allowing a third party application to access an open platform described in the first embodiment may be run in the open platform access system provided by the fourth embodiment of the invention. Details are the same to the description made with reference to the first embodiment, therefore, will not be repeated unnecessarily.

A Fifth Embodiment

Figure 6:
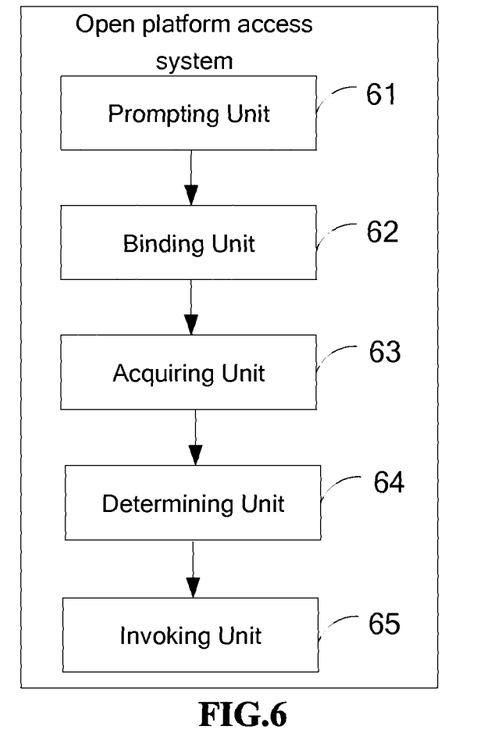
FIG. 6 is a structural diagram of an open platform access system provided by a fifth embodiment of the invention.

FIG. 6 is a structural diagram of an open platform access system provided by a fifth embodiment of the invention. For the sake of description, only parts relevant to embodiments of the present invention are illustrated in the figure.

The system comprises a prompting unit 61, a binding unit 62, an acquiring unit 63, a determining unit 64 and an invoking unit 65.

Compared with the fourth embodiment, there are following differences.

The prompting unit 61 is configured to prompt the user whether to bind the identification information of the user in the target open platform and the identification information of the user in the preset open platform, when receiving the information that the user is operating the third party application to access the target open platform for the first time, and to start the binding unit if information that the use determines the bind is received.

The binding unit 62 is configured to bind and store the identification information of the user in the target open platform and the identification information of the user in the preset open platform.

The acquiring unit 63, the determining unit 64 and the invoking unit 65 have the same function and operation approach with those of the acquiring unit 51, the determining unit 52 and the invoking unit 53 in the fourth embodiment, respectively.

The open platform access system provided in this invention can be used in above mentioned corresponding second embodiment of method. That is, the method for allowing a third party application to access an open platform described in the second embodiment may be run in the open platform access system provided by the fifth embodiment of the invention. Details are the same to the description made with reference to the second embodiment, therefore, will not be repeated unnecessarily.

In each of the embodiments above, when receiving the information that the user is operating a third party application to access the target open platform, the identification information used by a user to access a target open platform can be acquired from the received information.

Furthermore, the present invention provides a storage medium containing computer-executable instructions, wherein the computer-executable instructions, when being executed by a processor, are configured to perform a method for allowing a third party application to access an open platform, wherein the method comprises:

acquiring the identification information used by a user to access a target open platform, when receiving the information that the user is operating a third party application to access the target open platform, where the third party application is an application already launched on a preset open platform;

determining the identification information of the user in the preset open platform, according to the acquired identification information and the pre-established corresponding relationship between the identification information of the user in the target open platform and the identification information of the user in the preset open platform;

invoking the data of the target open platform stored in the preset open platform via an open interface of the preset open platform, according to the identification information of the user in the preset open platform.

It may be understood by one of ordinary skills in the art that all or a part of the steps for realizing the above embodiments may be accomplished through instructing related hardware by programs. Related programs may be stored in a computer-readable storage medium such as a ROM/RAM, a magnetic dis or a compact disk.

The above description only shows some preferred embodiments of the disclosure, rather than limiting the scope of the invention. All modifications, equivalent substitutions, improvements, etc., made without departing from the concept and principles of the invention should fall within the protection scope of the invention.

The invention claimed is:

1. A method for allowing a third party application to access an open platform, comprising:
   storing data of a target open platform in a preset open platform;
   prompting a user whether to bind first identification information of the user in a the target open platform and second identification information of the user in a the preset open platform, when receiving information that the user is operating the third party application to access the target open platform for the first time;
   if the user chooses to bind the first identification information of the user in the target open platform and the second identification information of the user in the preset open platform, binding and storing the first identification information of the user in the target open platform and the second identification information of the user in the preset open platform, before acquiring the first identification information used by the user to access the target open platform when receiving the information that the user is operating the third party application to access the target open platform;
   acquiring the first identification information used by the user to access the target open platform, when receiving the information that the user is operating the third party application to access the target open platform, wherein the third party application is an application already launched on the preset open platform;
   determining the second identification information of the user in the preset open platform, according to the acquired first identification information and a pre-established corresponding relationship between the first identification information of the user in the target open platform and the second identification information of the user in the preset open platform; and invoking the data of the target open platform stored in the preset open platform via an open interface of the preset open platform, according to the second identification information of the user in the preset open platform.

2. The method of claim 1, wherein the preset open platform is provided with a plurality of functional interfaces, and wherein after determining the second identification information of the user in the preset open platform, according to the acquired first identification information and the pre-established corresponding relationship between the first identification information of the user in the target open platform and the second identification information of the user in the preset open platform, the method further comprises:

invoking the functional interfaces of the preset open platform via the open interface of the preset open platform, according to the second identification information of the user in the preset open platform.

3. The method of claim 1, wherein the data of the target open platform comprises user relationship chain data and user information data in the target open platform.

4. An open platform access system, comprising:
a memory storing a plurality of program units; and
one or more processors configured to execute the plurality of program units to: store data of a target open platform in a preset open platform;

prompt a user whether to bind first identification information of the user in the target open platform and second identification information of the user in the preset open platform, when receiving information that the user is operating a third party application to access the target open platform for the first time;

start a binding unit if the user chooses to bind the first identification information of the user in the target open platform and the second identification information of the user in the preset open platform, wherein the binding unit is configured to bind and store the first identification information of the user in the target open platform and the second identification information of the user in the preset open platform, before acquiring the first identification information used by the user to access the target open platform when receiving the information that the user is operating the third party application to access the target open platform;

acquire the first identification information used by the user to access the target open platform, when receiving the information that the user is operating the third party application to access the target open platform, wherein the third party application is an application already launched on the preset open platform;

determine the second identification information of the user in the preset open platform, according to the acquired first identification information and a pre-established corresponding relationship between the first identification information of the user in the target open platform and the second identification information of the user in the preset open platform; and invoke the data of the target open platform stored in the preset open platform via an open interface of the preset open platform, according to the second identification information of the user in the preset open platform.

5. The system of claim 4, wherein the preset open platform is provided with a plurality of functional interfaces; and the invoking unit is further configured to invoke the functional interfaces of the preset open platform via the open interface of the preset open platform, according to the second identification information of the user in the preset open platform.

6. The system of claim 4, wherein the data of the target open platform comprises user relationship chain data and user information data in the target open platform.

7. A non-transitory storage medium comprising computer-executable instructions that, when executed, allow a third party application to access an open platform and cause a processor to:

store data of a target open platform in a preset open platform;

prompt a user whether to bind first identification information of the user in the target open platform and second identification information of the user in the preset open platform, when receiving information that the user is operating the third party application to access the target open platform for the first time;

if the user chooses to bind the first identification information of the user in the target open platform and the second identification information of the user in the preset open platform, bind and store the first identification information of the user in the target open platform and the second identification information of the user in the preset open platform, before acquiring the first identification information used by the user to access the target open platform when receiving the information that the user is operating the third party application to access the target open platform;

acquire the first identification information used by the user to access the target open platform, when receiving the information that the user is operating the third party application to access the target open platform, wherein the third party application is an application already launched on the preset open platform;

determine the second identification information of the user in the preset open platform, according to the acquired first identification information and a pre-established corresponding relationship between the first identification information of the user in the target open platform and the second identification information of the user in the preset open platform; and invoke the data of the target open platform stored in the preset open platform via an open interface of the preset open platform, according to the second identification information of the user in the preset open platform.

* * * * *